No. 688,467.  
Patented Dec. 10, 1901.
W. HORNE.  
SOLE EDGE TRIMMING MACHINE.  
(Application filed July 15, 1901.)
(No Model.)
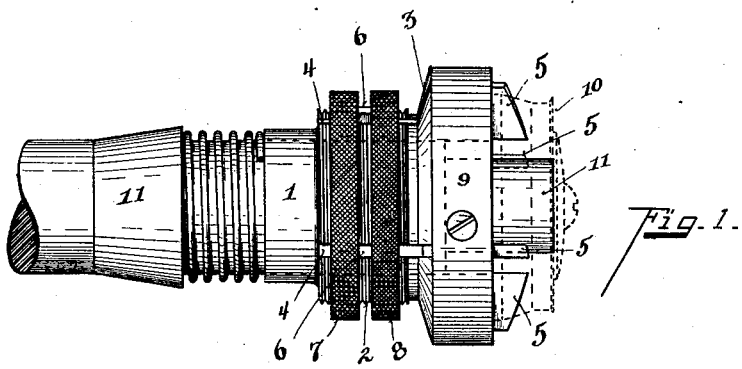
Fig. 1.
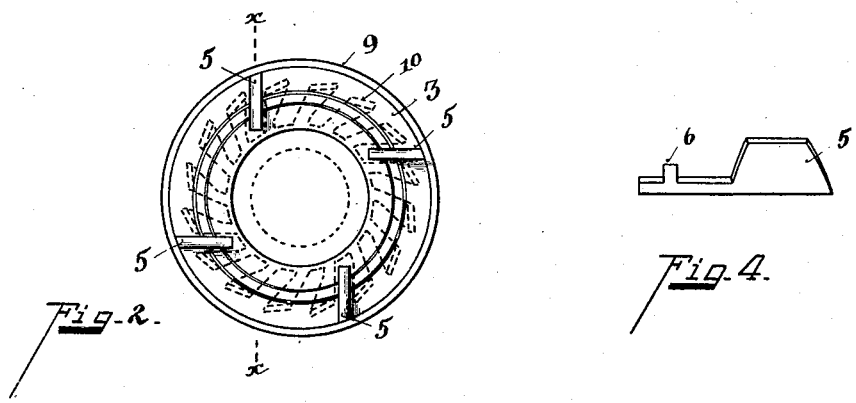
Fig. 2.
Fig. 4.
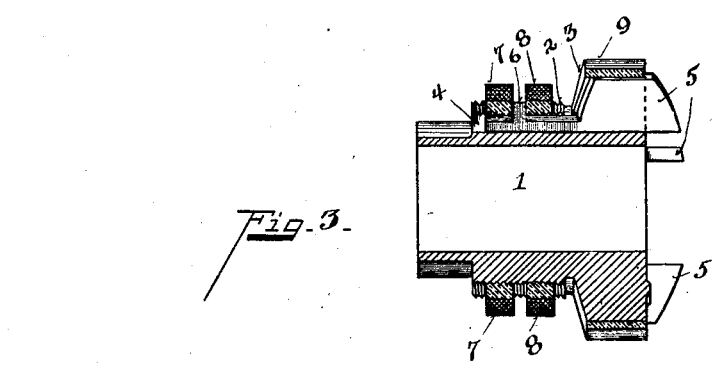
Fig. 3.
Witnesses  
Oliver B. Kaiser  
Edw. L. Alexander
Inventor  
William Horne  
By Wood & Wood  
Attorneys
THE NORRIS PETERS CO., PHOTO-LITHO., WASHINGTON, D. C.

UNITED STATES PATENT OFFICE.

WILLIAM HORNE, OF CHICAGO, ILLINOIS.

SOLE-EDGE-TRIMMING MACHINE.

SPECIFICATION forming part of Letters Patent No. 688,467, dated December 10, 1901.

Application filed July 15, 1901. Serial No. 68,316. (No model.)

*To all whom it may concern:*

Be it known that I, WILLIAM HORNE, a citizen of the United States, residing at Chicago, in the county of Cook and State of Illinois, have invented certain new and useful Improvements in Sole-Edge-Trimming Machines, of which the following is a specification.

The object of my invention is to provide means for adjusting and positively locking feather-edge blades which are movably seated longitudinally on the sleeve of a rotary cutter in a sole-edge-trimming machine.

The features of my invention are more fully set forth in the description of the accompanying drawings, forming a part of this specification, in which—

Figure 1 is a side elevation of my improved edge-trimmer for shoe-soles, showing the cutter in dotted lines. Fig. 2 is an end elevation of the cutter-sleeve. Fig. 3 is a section on line *x x*, Fig. 2. Fig. 4 is a plan view of one of the blades.

1 represents a cutter-sleeve having a screw-threaded shank 2 and an extended peripheral flange 3. 4 represents a series of longitudinal grooves formed in the said flange or hub and shank of the cutter-sleeve transversely to the screw-threads. 5 represents a series of feather-edge blades seated, respectively, in said grooves. As shown in Fig. 4, the widest portions of said blades or guards lie in and project endwise from the grooved flange of the cutter-sleeve and the narrower portions lie within the grooved shank of the cutter-sleeve. 6 represents a shoulder projected from the narrower portion of said feather-edge blades, which when the blades are in position in the grooves project radially beyond the periphery of the shank of the cutter-sleeve.

7 and 8 represent thumb-screw rings screw-threaded into the shank of the cutter-sleeve, respectively, above and below the projecting shoulders 6 of the feather-edge blades.

9 represents a band secured around the periphery of the flange of the cutter-sleeve. This band, together with the rings 7 and 8, holds the feather-edge blades longitudinally in their seats within the grooves of the cutter-sleeve. The screw-rings 7 and 8 bear upon the opposite faces of the shoulders 6 of the feather-edge blades.

10 represents the usual rotary cutter at the flanged end of the cutter-sleeve.

The cutter-sleeve and cutter are centrally hollow, the cutter-sleeve being secured to the shaft 11, and the cutter is secured to the shaft by a screw engaging into the end of the shaft. The feather-edge blades project beyond the flanged end of the cutter-sleeve at suitable intervals between the teeth of the rotary cutter, as shown in dotted lines, Fig. 2.

Mode of operation: The adjusting-rings 7 and 8 are turned on the shank of the cutter-sleeve until they respectively bear against the opposite faces of the shoulders 6 of the feather-edge blades, the rings are simultaneously grasped and turned in unison, one direction of rotation advancing the projecting ends of the feather-edge blades relative to the cutter, the other direction of rotation retracting the feather-edge blades farther into the flanged cutter-sleeve. The operative surface of the teeth of the cutter is thus easily and accurately determined, obtained, and maintained. These adjustable rings having independent bearing upon the respective opposite faces of the shoulders of the feather-edge blades serve as a nut-lock to positively clamp the feather-edge blades to any adjusted position. Notwithstanding the apparent simplicity of this problem a feather-edge-blade-adjusting mechanism for the rotary cutter of an edge-trimming machine which is simple, efficient, accurate, and adapted to be positively locked and easily operated has never before been produced in a manner substantially satisfying all the practical requirements.

Having described my invention, I claim—

1. In a sole-edge-trimming machine, in combination with a rotary cutter, a cutter-sleeve, feather-edge blades each adjustably seated in said sleeve and means for adjusting said blades in said sleeve, substantially as specified.

2. In a sole-edge-trimming machine, in combination with a rotary cutter, a cutter-sleeve, feather-edge blades each adjustably seated in said sleeve and means for simultaneously adjusting said blades in said sleeve, substantially as specified.

3. In a sole-edge-trimming machine, in combination with a rotary cutter, a cutter-sleeve, feather-edge blades each adjustably seated thereon and means for adjusting and locking said blades in said sleeve, substantially as specified.

4. In a sole-edge-trimming machine, in combination with a rotary cutter, a cutter-sleeve, feather-edge blades each adjustably seated thereon and means for simultaneously adjusting and simultaneously locking said blades in said sleeve, substantially as specified.

5. In a sole-edge trimmer, in combination with a screw-threaded rotary cutter, a cutter-sleeve, feather-edge blades each adjustably seated in said cutter-sleeve, rings screw-threaded in said cutter and having opposite bearings upon said blades for adjusting the blades longitudinally in either direction and locking them on the sleeve, substantially as specified.

6. In a sole-edge trimmer, in combination with a rotary cutter, a cutter-sleeve having a screw-threaded shank, feather-edge blades adjustably seated in longitudinal grooves in the cutter-sleeve, the ends of the blades projected between the teeth of the rotary cutter, the said blades having shoulders radially projected from the screw-threaded shank of the cutter-sleeve and an adjustable ring on the screw-threaded shank adapted to bear against the said shoulders, substantially as specified.

7. In a sole-edge trimmer, in combination with a rotary cutter, a cutter-sleeve having a screw-threaded shank, the cutter-sleeve and shank having longitudinal grooves formed thereon, feather-edge blades seated in said grooves, having projections radially extended from the shank of the cutter-sleeve and adjusting-rings screw-threaded upon said shank and adapted to bear against the opposite faces of said projection, substantially as specified.

8. In a sole-edge trimmer, in combination with a rotary cutter, a cutter-sleeve having an extended flange and a screw-threaded shank, longitudinal grooves formed in the shank and flange of the cutter-sleeve, feather-edge blades adjustably seated within said grooves, shoulders formed on the blades radially projecting from the shank of the cutter-sleeve, adjusting-rings screw-threaded upon said shank upon opposite sides of said shoulders, substantially as specified.

9. In a sole-edge trimmer, in combination with a rotary cutter, a cutter-sleeve having a screw-threaded shank, feather-edge blades adjustably seated in longitudinal grooves in the cutter-sleeve having radial projections on the shank of said sleeve, independent rings screw-threaded on the shank upon opposite sides of the projections, whereby the said blades may be adjusted in either direction and positively locked in the adjusted position, substantially as specified.

10. In a sole-edge trimmer, in combination with a rotary cutter, a cutter-sleeve having a screw-threaded shank, feather-edge blades longitudinally seated on said sleeve, two independent rings screw-threaded on said shank and shoulders radially projected from said blades between the said rings, substantially as specified.

In testimony whereof I have hereunto set my hand.

WILLIAM HORNE.

Witnesses:
THEODORE SMITH,
N. J. GRENNING.